United States Patent [19]

Thomas et al.

[11] Patent Number: 5,754,603
[45] Date of Patent: May 19, 1998

[54] PSEUDO RANDOM NUMBER SEQUENCE SYNCHRONIZATION IN COMMUNICATIONS SYSTEMS

[75] Inventors: Philip H. Thomas, Carp; Gang Li, Nepean; Rui Wang, Ottawa, all of Canada; Iouri Trofimov, Moscow, Russian Federation; Alexandre Chloma; Mikhail Bakouline, both of Moskovskaja oblast, Russian Federation; Vitali Kreindeline, Moscow, Russian Federation

[73] Assignee: Northern Telecom Limited, Montreal, Canada

[21] Appl. No.: 688,670

[22] Filed: Jul. 29, 1996

[51] Int. Cl.$^6$ .................................................. H04L 7/00
[52] U.S. Cl. .............................. 375/367; 375/208; 370/515
[58] Field of Search ............................ 375/208, 367, 375/354; 370/515, 514

[56] References Cited

U.S. PATENT DOCUMENTS

| | | | |
|---|---|---|---|
| 5,163,070 | 11/1992 | Bielby et al. | 375/367 |
| 5,181,225 | 1/1993 | Nesser et al. | 375/1 |
| 5,440,597 | 8/1995 | Chung et al. | 375/200 |

OTHER PUBLICATIONS

R. B. Ward et al., "Acquisition of Pseudonoise Signals by Recursion-Aided Sequential Estimation", IEEE Transactions on Communications, vol. COM-25, No. 8, Aug. (1977), pp. 784–794.

R. B. Ward, "Acquisition of Pseudonoise Signals by Sequential Estimation", IEEE Transactions on Communications, vol. COM-13, No. 4, Dec. (1965), pp. 475–483.

Bakulin et al., "An Algorithm for Filtering Linear Recurrent Sequences from a Mixture with Noise" Telecommunications and Radio Engineering, vol. 48, No. 9, May (1995), pp. 119–125.

Bakulin et al., Radiotekhnika, vol. 6, Sep. (1994), pp. 68–74.

Primary Examiner—Temesghen Ghebretinsae
Attorney, Agent, or Firm—Foley & Lardner

[57] ABSTRACT

A method of synchronizing to a pseudo random sequence, which can be generated by a linear feedback shift register having k stages and p intermediate taps, where k and p are positive integers and k>p, and a synchronization arrangement for carrying out the method are described. A received symbol sequence is supplied to a k-stage shift register with p intermediate taps in positions corresponding to the p taps of the linear feedback shift register. A respective correlation signal is recursively added at an input for the received symbol sequence and at each intermediate tap. Each correlation signal is produced by correlating at least two signals from said input, intermediate taps, and output other than the signal to which the respective correlation signal is added. The invention is particularly applicable to pilot synchronization in CDMA terminals.

20 Claims, 2 Drawing Sheets

PSEUDO RANDOM NUMBER SEQUENCE SYNCHRONIZATION IN COMMUNICATIONS SYSTEMS

This application claims the benefit of U.S. Provisional application Ser. No. 60/001,885 filed Aug. 3, 1995, the entire contents and disclosure of which are hereby incorporated herein by reference.

This invention relates to synchronization in communications systems, for example spread spectrum cellular systems or other wireless digital communications systems, and is particularly concerned with synchronization in such systems using long pseudo random number sequences.

BACKGROUND OF THE INVENTION

In spread spectrum communications systems, fast synchronization to a long pseudo random or pseudo noise sequence, referred to for brevity as a PN sequence, is of importance. It is known to handle PN sequence synchronization by using auto-correlation characteristics of the PN sequence. One type of PN sequence widely used in practice is a maximal length sequence, referred to as an m-sequence, which is generated by a linear feedback shift register. If the shift register has k stages, then the length of the m-sequence is $2^k-1$ symbols.

Long PN sequences are often employed to achieve a desired performance in spread spectrum communications systems. However, the use of a long PN sequence increases the time required to establish synchronization, and considerable efforts have been made to reduce this time.

Existing PN sequence synchronization methods can be summarized in the following three sets:

The first set comprises serial-parallel step-by-step searching methods, which include matched filter and sliding window methods. While these methods can be applied to any given sequence, they involve the disadvantages of relatively slow synchronization and complex implementation.

The second set comprises recurrent searching methods, which utilize the structural characteristics of a given PN sequence. A major advantage of these methods is that synchronization can be achieved based on only a small part of a very long sequence when the SNR (signal-to-noise ratio) is high. However, these methods have not been effective when the SNR is low, for example less than 0 dB, because only a small part of the sequence is used for synchronization.

The third set comprises fast searching methods which are based on a spectral representation of the received sequence and employ fast transform algorithms such as fast Fourier, Hadamard, or Walsh transforms. For a short PN sequence, these methods achieve relatively rapid synchronization if the additive noise is white Gaussian. However, these methods have the disadvantage that synchronization requires the entire PN sequence to be processed, so that it is not practical to use them for long PN sequences. In addition, these methods are only applicable to m-sequences; to date an effective method has not been found for factorization of an incomplete circular matrix, such factorization being essential for fast spectral transform algorithms.

An object of this invention is to provide an improved method of achieving synchronization to a pseudo random number sequence, which can facilitate fast synchronization to a long PN sequence even at a low SNR and when the PN sequence is not an m-sequence. Thus the method of this invention comes within the second set referred to above, but facilitates operation with a low SNR.

SUMMARY OF THE INVENTION

This invention provides a method of synchronizing to a PN (pseudo random) sequence which can be generated by a linear feedback shift register having k stages and p intermediate taps, where k and p are positive integers and k>p, comprising the steps of: supplying a received symbol sequence to an input of, and shifting the sequence through, a shift register having k stages with p intermediate taps in positions corresponding to the p taps of the linear feedback shift register; recursively adding a respective correlation signal at the input and at each intermediate tap of the shift register; and producing each correlation signal by correlating at least two signals from said input, intermediate taps, and output of the shift register other than the signal to which the respective correlation signal is added.

Viewed alternatively, the invention provides a method of synchronizing a received symbol sequence to a PN (pseudo random) sequence which can be generated by a linear feedback shift register having k stages and p intermediate taps, where k and p are positive integers and k>p, comprising the steps of: shifting the received symbol sequence through a shift register having k stages with p intermediate taps in positions corresponding to the p taps of the linear feedback shift register; at the input and at each intermediate tap of the shift register, recursively adding to the shift register contents a respective correlation signal; producing the correlation signal for adding at the input of the shift register by correlating the p+1 signals from the p intermediate taps and the output of the shift register; and producing the correlation signal for adding at each of the p intermediate taps by correlating the p+1 signals from the input, output, and p-1 other intermediate taps of the shift register.

Conveniently, the step of producing each correlation signal comprises producing a product of the signs and of a minimum absolute value of the p+1 signals being correlated, so that the correlations do not require division or multiple digit multiplication and can be easily implemented for example in a digital signal processor (DSP) integrated circuit. The received symbol sequence can be supplied to the input of the shift register via a non-linear function.

The method of the invention avoids or reduces the disadvantages discussed above, and can provide reliable synchronization even for negative SNR. In addition, the method can establish synchronization after processing only a small pair of the full PN sequence, the size of this part depending on the SNR, so that it is useful for very long PN sequences. The method considers the received sequence to be a degenerated Markov chain, and an algorithm of recursive estimation of symbols in the sequence is synthesized using the principles of non-linear minimum mean-square error estimation.

The invention also provides a synchronization arrangement for synchronizing an input symbol sequence in accordance with a PN (pseudo random) sequence which can be generated by a linear feedback shift register having k stages and p intermediate taps, where k and p are positive integers and k>p, comprising: a k-stage shift register having an input, an output, and p intermediate taps in positions corresponding to the p taps of the linear feedback shift register; a first correlator for correlating p+1 signals from the p intermediate taps and the output of the shift register to produce a first correlation signal; a first adder arranged for recursively adding the first correlation signal to the input symbol sequence and for supplying the sum to the input of the shift register; p further adders each arranged at a respective one of the p intermediate taps of the shift register for recursively adding a respective one of p further correlation signals to the contents of the shift register at the respective tap; and p further correlators, each arranged for supplying a respective one of the p further correlation signals to the respective further adder, for correlating signals from the input, the output, and the p−1 other intermediate taps of the shift register.

In the simplest form of the method and synchronization arrangement, p=1 and the PN sequence is an m-sequence.

The invention is particularly useful in communications systems which may require fast PN sequence synchronization in relatively low SNR conditions, such as direct sequence spread spectrum communications systems, for example for synchronization to the pilot PN sequence in the pilot channel in an IS-95 CDMA terminal.

BRIEF DESCRIPTION OF THE DRAWINGS

The invention will be further understood from the following description with reference to the accompanying drawings, in which.

DETAILED DESCRIPTION

Figure 1:
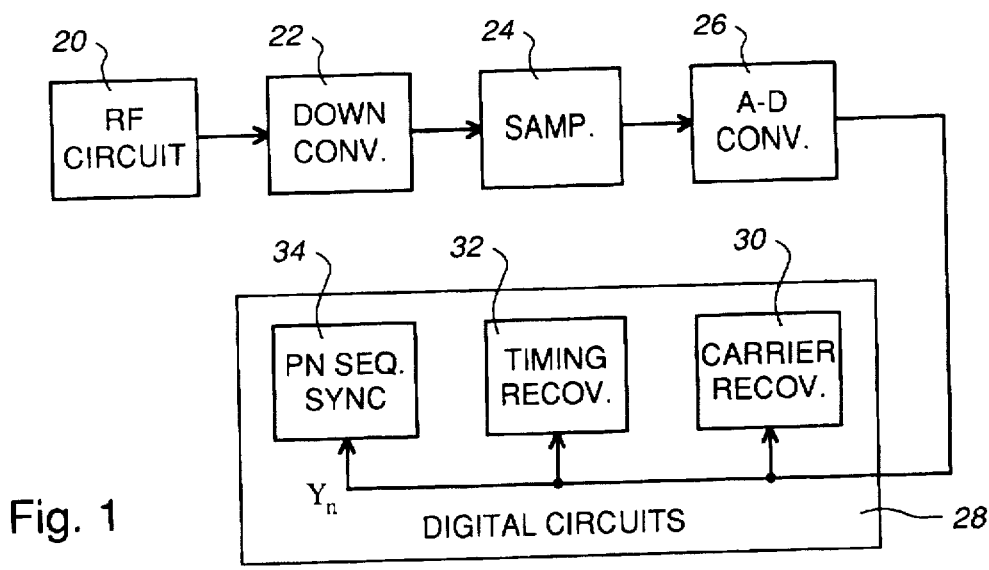
FIG. 1 schematically illustrates a block diagram of part of a wireless digital communications receiver.

The following description presents an algorithm for general channel conditions, followed by a simplified algorithm which facilitates practical implementation, and a further simplification for a Gaussian channel. A physical implementation of an embodiment of the invention is then described in detail.

General Channel Conditions

For extracting symbols $b_i = \pm 1$, counted by an integer i and having a symbol duration $T_0$, of a PN sequence of length M symbols from a received input signal $Y_n$ accompanied by noise represented by a random value sequence $y_n$, where n is an integer identifying each sampling point, a processing state is given by equation (1):

$$Y_n = \Psi\left( \sum_{i=1}^{m} b_i f\left( \frac{n\Delta t + (i-1)T_0 - \tau_n}{T_0} \right), y_n \right) \quad (1)$$

where the received signal is assumed for convenience to have unit amplitude, $\Delta t$ is the sampling interval, $\tau_n$ is a PN sequence delay for the sampling point n and is assumed to be constant for all sampling points, f() is a function representing the pulse form which has non-zero values only in the interval (0,1), and $\Psi(.)$ is a function which represents the interaction between the signal and noise.

Assuming that the sampling interval $\Delta t = T_0$ and that noise samples are not correlated for this sampling interval, then equation (1) can be expressed as:

$$Y_n = \Psi\left( \sum_{i=1}^{m} b_i f[n - i + 1 - q], y_n \right) \quad (2)$$

where q is a discrete random variable uniformly distributed in the interval [0,M−1]. Assuming that the symbol timing (i.e., clock) recovery is perfect, the pulse form function f[n−i+1−q] is a delta function which has a value of 1 for n−i+1−q=0 and otherwise has a value of 0. Using the notation:

$$B_n \equiv \sum_{i=1}^{m} b_i f[n - i + 1 - q] \quad (3)$$

gives the results:

$$B_n = b_{n-q+1} \quad (4)$$

$$Y_n = \Psi(B_n, y_n) \quad (5)$$

Figure 2:
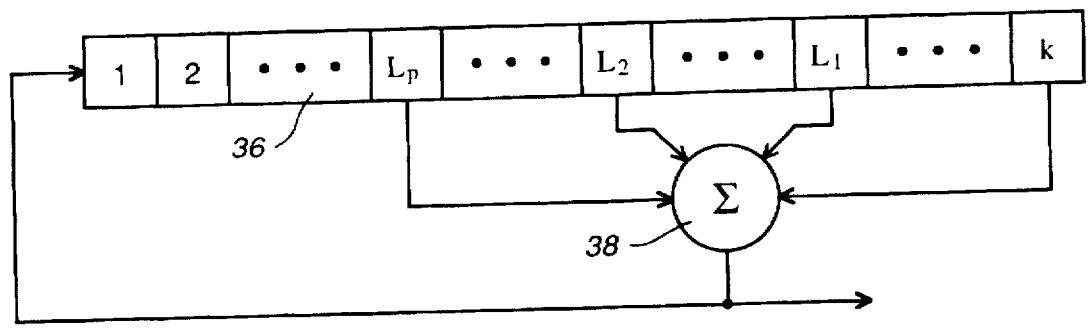
FIG. 2 schematically illustrates a linear feedback shift register for generating a PN sequence.

A linear feedback shift register, having k stages and p taps at stages $L_1, L_2, \ldots L_p$, can be used as illustrated in FIG. 2 and described below to generate a sequence in accordance with a polynomial G(D) of order k given by:

$$G(D) = D^k + \sum_{i=1}^{p} D^{L_i} + 1 \quad (6)$$

where i, p, and k are integers. The n-th symbol of such a sequence is determined by a subsequence comprising the k symbols preceding the n-th symbol, so that:

$$B_n = B_{n-k} B_{n-L_1} B_{n-L_2} \ldots B_{n-L_p} \quad (7)$$

If the polynomial represented by equation (6) is primitive, then the generated sequence is an m-sequence (maximal length sequence) with a length or period of $M = 2^k - 1$ symbols.

Equations (5) and (7) define a state-space model in which the random sequence $B_n$ is a k-th order Markov chain.

Considering the simplest case of p=1, i.e., the linear feedback shift register has only one intermediate tap at the stage $L_1$, and putting $L = L_1$, the following expression for the likelihood function $P(Y_n|B_n)$ can be derived:

$$P(Y_n|B_n) = C(Y_n)(1 + B_n \phi(Y_n)) \quad (8)$$

where $C(Y_n)$ is a normalizing coefficient and $\phi(Y_n)$ is a function of $Y_n$ determined by the noise distribution density and by the form of the function $\Psi(.)$.

For additive noise, for which $Y_n = B_n + y_n$, representing the PDF (probability density function) of $y_n$ as $P_y$ and putting $B_n = \pm 1$ gives:

$$\phi(Y_n) = \frac{P_y(Y_n - 1) - P_y(Y_n + 1)}{P_y(Y_n - 1) + P_y(Y_n + 1)} \quad (9)$$

which for zero mean Gaussian noise with variance $\sigma^2$ gives:

$$\phi(Y_n) = \tanh\left( \frac{Y_n}{\sigma^2} \right) \quad (10)$$

An expression for the case of non-additive noise can be similarly determined.

Using the least root-mean-square error criterion to determine an optimal estimate of $B_{n-i}$ at the (n−1)-th iteration, and representing this estimate by $\hat{B}_{n-i}^{n-1}$ where i is an integer from 1 to k, a maximum probability extrapolation estimate $\hat{B}_n$ can be found by applying the known properties of Markov chains to the above to be given by:

$$\hat{B}_n = \text{sgn}\hat{B}_{n-k}^{n-1} \text{sgn}\hat{B}_{n-L}^{n-1} \quad (11)$$

With $\tau$ being an integer from 1 to k, and denoting the n-th iteration of a recursive non-linear minimum mean-square estimate of the symbol $B_{n-\tau}$ by $\hat{B}_{n-\tau}^n$, a recursive algorithm can be derived as given by equation (12):

$$\hat{B}_{n-\tau+1}^n = \begin{cases} \hat{B}_{n-\tau+1}^{n-1} & \tau \neq L+1 \\ & \tau \neq 1 \\ \dfrac{\hat{B}_{n-k}^{n-1}\phi(Y_n) + \hat{B}_{n-L}^{n-1}}{1+\phi(Y_n)\hat{B}_{n-k}^{n-1}\hat{B}_{n-L}^{n-1}} & \tau = L+1 \\ \dfrac{\phi(Y_n) + \hat{B}_{n-k}^{n-1}\hat{B}_{n-L}^{n-1}}{1+\phi(Y_n)\hat{B}_{n-k}^{n-1}\hat{B}_{n-L}^{n-1}} & \tau = 1 \end{cases} \quad (12)$$

Figure 3:
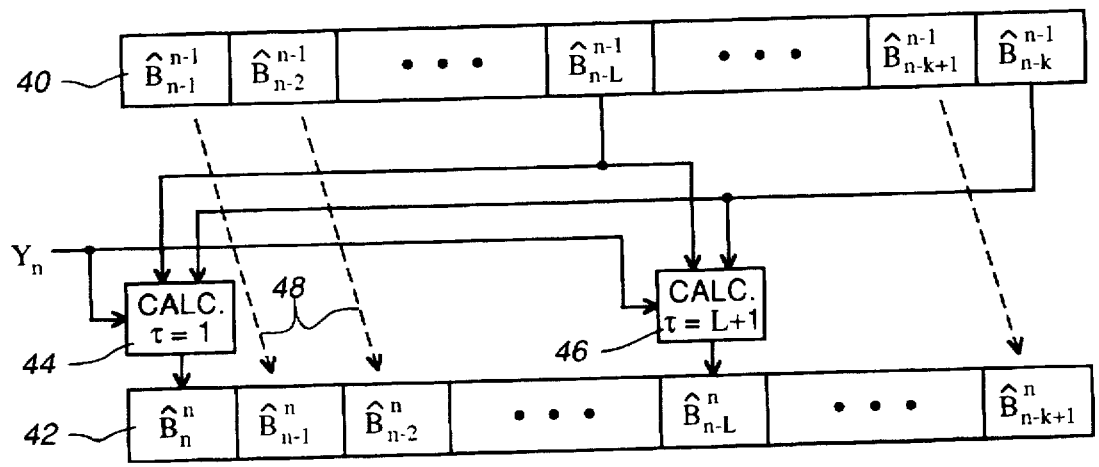
FIG. 3 schematically illustrates a recursive updating process in accordance with an embodiment of the invention.

This recursive algorithm represents a method of filtering a discrete PN sequence of symbols using the initial condition $B_{1-\tau}^0$ with $\tau$ being an integer from 1 to k, an implementation of which is illustrated by FIG. 3 described below.

The performance of the algorithm is affected by the choice of initial conditions, i.e., the initial contents of the shift register. Initially zeroing the shift register stages has been found by simulation for certain channel conditions to be a desirable choice.

The above algorithm relates to the case of p=1, but can be generalized for the case when $p \geq 1$ to the following form:

$$\hat{B}_{n-\tau+1}^n = \quad (13)$$

$$\begin{cases} \hat{B}_{n-\tau+1}^{n-1} & \tau \neq L_t+1, t=1,2,\ldots p \\ & \tau \neq 1 \\ \dfrac{\hat{B}_{n-k}^{n-1}\phi(Y_n) + \Pi_{i=1,i\neq t}^{p}\hat{B}_{n-L_i}^{n-1} + \hat{B}_{n-L_t}^{n-1}}{1+\phi(Y_n)\hat{B}_{n-k}^{n-1}\Pi_{i=1}^{p}\hat{B}_{n-L_i}^{n-1}} & \tau = L_t+1, t=1,2,\ldots p \\ \dfrac{\phi(Y_n) + \hat{B}_{n-k}^{n-1}\Pi_{i=1}^{p}\hat{B}_{n-L_i}^{n-1}}{1+\phi(Y_n)\hat{B}_{n-k}^{n-1}\Pi_{i=1}^{p}\hat{B}_{n-L_i}^{n-1}} & \tau = 1 \end{cases}$$

with the initial condition as for equation (12) above. It can be seen that equation (12) represents a special case of equation (13) for p=1, and that equation (13) is generally applicable for all possible values of p.

If the PN sequence is an m-sequence as discussed above, then it is usually possible to find a generating polynomial for which the corresponding linear feedback shift register has only one intermediate tap, i.e., for which p=1 so that the simpler algorithm of equation (12) can be used.

It is known that the sequential element-by-element product of two periodic m-sequences is also a periodic sequence. Consequently, a new recursive equation $$B_n = B_{n-f} B_{n-g} \quad (14)$$

where f and g are integers with g>f, can be applied with the length and feedback tap of the formulating shift register being determined by f. The pairs of (f, g) corresponding to all m-sequences for $5 \leq k \leq 10$ can be computed. Thus the algorithm of equation (12) can be used for m-sequences; however, it is necessary to use the recursive algorithm in the form of equation (14) for general shift register sequences.

Simplified Algorithm

The algorithms of equations (12) and (13) can be simplified using hyperbolic functions and the following notations:

$$\gamma_n = a \tan h\phi(Y_n)$$

$$\hat{U}_{n-i}^{n-1} = a \tan h\, \hat{B}_{n-i}^{n-1}$$

$$\hat{U}_{n-i}^n = a \tan h\, \hat{B}_{n-i}^n \quad (15)$$

i=1, 2, . . . k with the approximation:

$$a \tan h(\tan h \times \tan h\, y) = \text{sgn}\, x \times \text{sgn}\, y \, \min\{|x|,|y|\} \quad (16)$$

For the special case of p=1, equation (12) then becomes:

$$\hat{U}_{n-\tau+1}^n = \quad (17)$$

$$\begin{cases} \hat{U}_{n-\tau+1}^{n-1} & \tau \neq L+1 \\ & \tau \neq 1 \\ \hat{U}_{n-L}^{n-1} + \text{sgn}\hat{U}_{n-k}^{n-1}\,\text{sgn}\,\gamma_n\,\min\{|\hat{U}_{n-k}^{n-1}|,|\gamma_n|\} & \tau = L+1 \\ \gamma_n + \text{sgn}\hat{U}_{n-k}^{n-1}\,\text{sgn}\hat{U}_{n-L}^{n-1}\,\min\{|\hat{U}_{n-k}^{n-1}|,|\hat{U}_{n-L}^{n-1}|\} & \tau = 1 \end{cases}$$

the implementation of which is much simpler than the implementation of equation (12), especially in that, although it requires sign (sgn) multiplications, it does not require any multiple digit multiplications or divisions.

Correspondingly, for the general case in which $p \geq 1$, equation (13) is simplified to the following equation (18):

$$\hat{U}_{n-\tau+1}^n = \begin{cases} \hat{U}_{n-\tau+1}^{n-1} & \begin{matrix}\tau \neq L_t+1,\\ t=1,2,\ldots p\\ \tau \neq 1\end{matrix} \\ \hat{U}_{n-L_t}^{n-1} + \text{sgn}\hat{U}_{n-k}^{n-1}\,\text{sgn}\,\gamma_n\,\Pi_{i=1,i\neq t}^{p}\text{sgn}\hat{U}_{n-L_i}^{n-1}\,\min \\ \quad \left\{\begin{matrix}|\hat{U}_{n-k}^{n-1}|,|\gamma_n|,|\hat{U}_{n-L_1}^{n-1}|,\ldots|\hat{U}_{n-L_{t-1}}^{n-1}|,|\hat{U}_{n-L_{t+1}}^{n-1}|,\\ \ldots |\hat{U}_{n-L_p}^{n-1}|\end{matrix}\right\} & \begin{matrix}\tau = L_t+1,\\ t=1,2,\ldots p\end{matrix} \\ \gamma_n + \text{sgn}\hat{U}_{n-k}^{n-1}\,\Pi_{i=1}^{p}\text{sgn}\hat{U}_{n-L_i}^{n-1}\,\min\left\{\begin{matrix}|\hat{U}_{n-k}^{n-1}|,|\hat{U}_{n-L_1}^{n-1}|,\\ \ldots |\hat{U}_{n-L_p}^{n-1}|\end{matrix}\right\} & \tau = 1 \end{cases}$$

with the initial condition $U_{1-\tau}^0$ with $\tau$ being an integer from 1 to k.

Simplified Algorithm for Channel with AWGN

The above algorithms can be further simplified if the noise on the channel is only additive white Gaussian noise (AWGN), represented by:

$$\gamma_n = \frac{Y_n}{\sigma_n^2} \quad (19)$$

Substituting from equation (19) into equation (17) gives:

$$\hat{v}_{n-\tau+1}^n = \begin{cases} \hat{v}_{n-\tau+1}^{n-1} & \tau \neq L+1 \\ & \tau \neq 1 \\ \hat{v}_{n-L}^{n-1} + \operatorname{sgn}\hat{v}_{n-k}^{n-1} \operatorname{sgn} Y_n \min\{|\hat{v}_{n-k}^{n-1}|, |Y_n|\} & \tau = L+1 \\ Y_n + \operatorname{sgn}\hat{v}_{n-k}^{n-1} \operatorname{sgn}\hat{v}_{n-L}^{n-1} \min\{|\hat{v}_{n-k}^{n-1}|, |\hat{v}_{n-L}^{n-1}|\} & \tau = 1 \end{cases} \quad (20)$$

with the initial condition $v_{-\tau}^0$ with $\tau$ being an integer from 1 to k, where:

$$\hat{v}_{n-k}^{n-1} = \sigma_y^2 \hat{U}_{n-k}^{n-1}$$

$$\hat{v}_{n-\tau}^n = \sigma_y^2 \hat{U}_{n-\tau}^n \quad (21)$$

and $\sigma_y^2$ can be unknown. A similar substitution can be made into equation (18) to produce a simplified equation for the general case in which $p \geq 1$.

Physical Implementation

Referring now to the drawings, FIG. 1 illustrates in a block diagram parts of a wireless digital communications receiver, for example for a spread spectrum cellular communications system compatible with the IS-95 standard, in which a wireless digital communications signal is supplied via an RF (radio frequency) circuit 20 of a receiver to a down converter 22 to produce a signal which is sampled by a sampler 24, the samples being converted into digital form by an A-D (analog-to-digital) converter 26 for processing in digital circuits 28 conveniently implemented in a DSP integrated circuit. The digital circuits 28 include a carrier recovery block 30, a timing or clock recovery block 32, and a PN sequence synchronization block 34 in which processing of the digital signals is performed. The PN sequence synchronization block 34 is supplied with the sampled and digitized received symbol sequence from the output of the A-D converter 26, and this constitutes the input signal $Y_n$ of equation (1) above and is the input to the synchronization arrangement described below with reference to FIG. 4.

FIG. 2 illustrates a linear feedback shift register arrangement which can be used to produce a PN sequence for synchronization. The arrangement comprises a shift register 36 having k stages numbered 1 to k, with the outputs of the k-th stage and of intermediate taps along the shift register at the outputs of stages $L_1$, $L_2$, and $L_p$ supplied to inputs of a modulo-2 adder 38. An output of the adder 38 is fed back to the input of the first stage of the shift register and also constitutes a PN sequence output signal in accordance with equation (7) above. In its simplest form, the shift register has only one intermediate tap, i.e., p=1, and for simplicity the arrangements in FIGS. 3 to 5 relate to the case of p=1.

FIG. 3 illustrates the recursive filtering or updating process which is represented by the equation (12) for the case of p=1. An upper block 40 represents the state at an arbitrary (n−1)-th iteration of a k-stage shift register with one intermediate tap at the output of the stage L, corresponding to the position of an intermediate tap of a linear feedback shift register which could be used as described above with reference to FIG. 2 to generate the PN sequence to be synchronized to. A lower block 42 represents the state of the shift register after one iteration, updated as indicated by a calculation 44 for the case of τ=1 in accordance with the third line of equation (12), by a calculation 46 for the case of τ=L+1 in accordance with the second line of equation (12), and by shifting of the register stage contents as shown by inclined broken lines 48 for the other conditions in accordance with the first line of equation (12).

Figure 4:
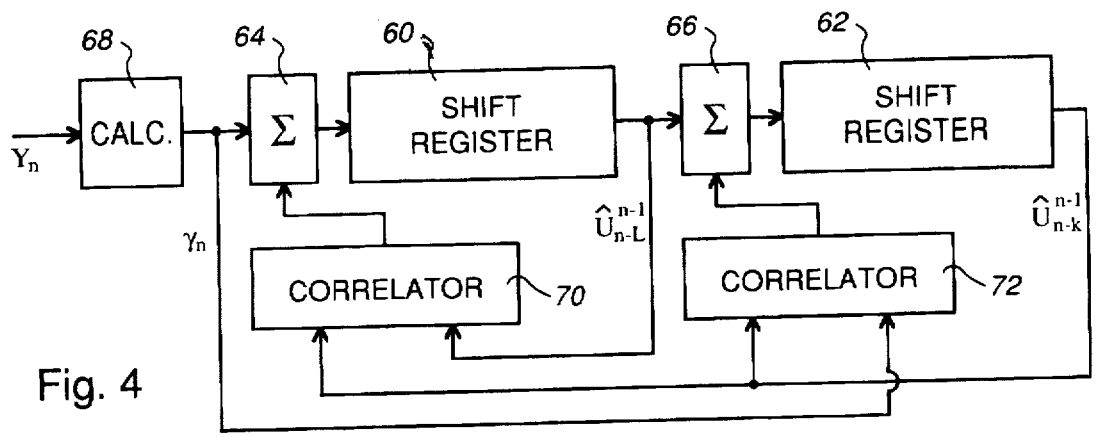
FIG. 4 schematically illustrates in a block diagram a synchronization arrangement in accordance with an embodiment of the invention.
Figure 5:
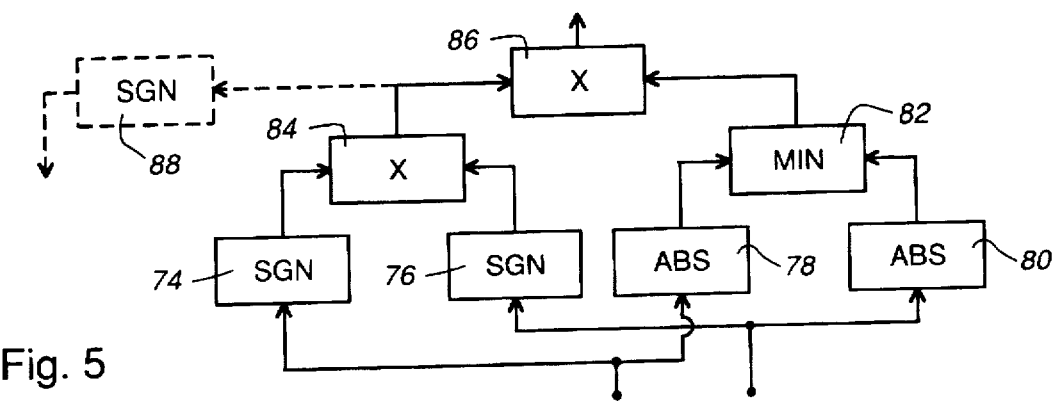
FIG. 5 schematically illustrates in greater detail a correlation block of the synchronization arrangement of FIG. 4.

FIGS. 4 and 5 illustrate a corresponding physical implementation of the synchronization arrangement for the simplified algorithm of equation (17). Referring to FIG. 4, the arrangement comprises two shift register parts 60 and 62 having stages 1 to L and L+1 to k respectively. The first stages 1 and L+1 of the shift register parts 60 and 62 respectively are supplied with the outputs of adders 64 and 66 respectively. A calculator 68 produces an output signal $\gamma_n$ from the input signal $Y_n$ constituted by the received symbol sequence in accordance with the first line of equation (15) above. Two correlators 70 and 72, described below with reference to FIG. 5, perform a correlation of the output of the k-th stage of the shift register with respectively the output of the L-th stage of the shift register part 60 and the signal $\gamma_n$ from the calculator 68. The adder 64 adds the output of the correlator 70 to the signal $\gamma_n$ from the calculator 68, and the adder 66 adds the output of the correlator 72 to the output of the L-th stage of the shift register part 60.

FIG. 5 illustrates the form of the correlator 70 (the correlator 72 is the same) and an additional function, shown in broken lines in FIG. 5, as described below. As shown in FIG. 5, the correlator comprises two sign functions (SGN) 74 and 76, which are supplied with the input signals to the correlator and produce at their outputs sign signals representing the signs of these inputs, two absolute value functions (ABS) 78 and 80, which are supplied with the input signals to the correlator and produce at their outputs signals representing the absolute values of these inputs, a minimum function (MIN) 82, which produces at its output the minimum value of the absolute values supplied to its inputs from the functions 78 and 80, and two multipliers 84 and 86. The multiplier 84 produces at its output a product of the sign signals supplied to its inputs from the functions 74 and 76, and the multiplier 86 multiplies this output by the minimum value produced by the function 82 to produce the output signal of the correlator. As can be appreciated, all of these functions can be easily implemented within a DSP integrated circuit, without requiring division or multiple digit multiplication operations.

It can easily be seen that the synchronization arrangement of FIGS. 4 and 5 operates in accordance with equation (17) above. Initially the shift register contents are zeroed, and the synchronized PN sequence can be obtained from the contents of the shift register parts 60 and 62 when synchronization has been achieved. It can also be seen that this arrangement operates in accordance with the simplified equation (20) for a channel with AWGN simply by replacing the non-linear calculation function 68 by a constant.

FIG. 5 also illustrates in broken lines an optional additional sign function (SGN) 88, which is supplied with the output of the multiplier 84 of the correlator 70. The output of the function 88 constitutes the symbol estimate $\hat{B}_n$ in accordance with equation (11), and thus this is easily provided as a byproduct of the synchronization process.

Although the above description relates specifically to the case of p=1, it can easily be seen how the synchronization arrangement of FIGS. 4 and 5 can be expanded for cases in which p>1, for example in accordance with equation (18).

Figure 6:
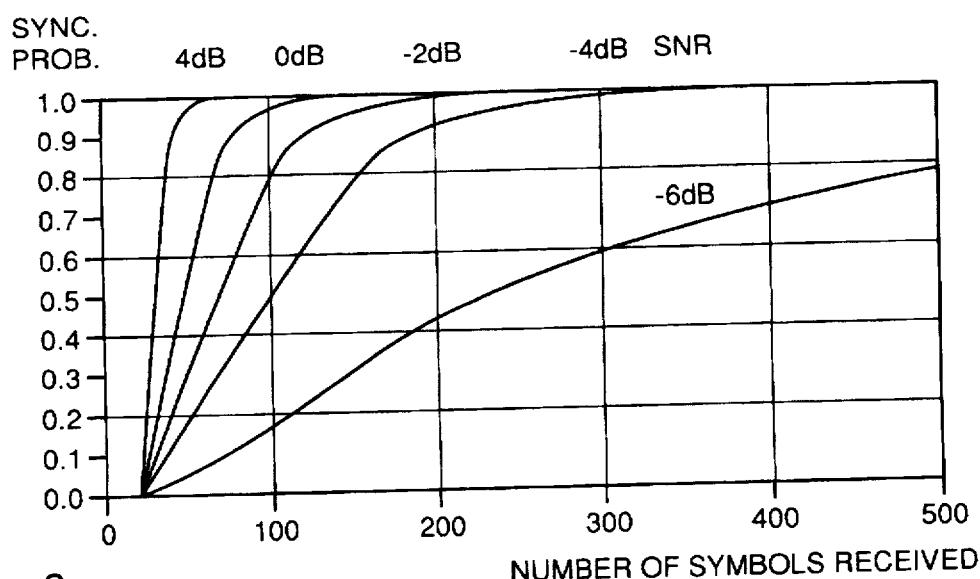
FIG. 6 illustrates performance of the arrangement indicated by simulation results.

FIG. 6 illustrates approximately performance of the synchronization method and arrangement described above as expected from simulation results. This relates to a PN sequence of order k=21 with the generation polynomial $$G_{21}(D)=1+D^2+D^{21} \tag{22}$$

This is an m-sequence with p=1 and period (i.e., sequence length) of $2^k-1$, or 2,097,151 symbols. The simulation assumed BPSK modulation, a channel containing only AWGN, and that synchronization is achieved when the signs of contents of the shift register 60, 62 at the receiver are the same as a delayed version of the generated and transmitted sequence over the length of the shift register. FIG. 6 shows the probability of synchronization plotted against number of symbols of the sequence received, for various SNRs.

As can be seen from FIG. 6, even with a very low SNR of −4 dB, synchronization is achieved within about 400 received symbols of the PN sequence. With better SNRs, the number of symbols of the PN sequence needed to establish synchronization, and hence the speed of synchronization, is rapidly decreased, with only about 65 symbols (a very small part of the sequence) being needed for synchronization at SNRs of about 4 dB or better. For other, lower order, PN sequences the number of symbols required for synchronization is further reduced, for example less than 40 symbols for an m-sequence with k=11 and p=1 for an SNR of about 4 dB.

The synchronization arrangement described above is particularly advantageous in cases where the SNR is low, for example less than 0 dB. For very low SNR, the arrangement can be used for one stage of a multiple stage system. It is further noted that the arrangement has the advantage that its complexity is largely independent of the PN sequence length, being proportionally dependent upon the length of the PN sequence generating register.

Although particular embodiments of the invention have been described in detail, it should be appreciated that numerous modifications, variations, and adaptations may be made without departing from the scope of the invention as defined in the claims.

What is claimed is:

1. A method of synchronizing to a PN (pseudo random) sequence which can be generated by a linear feedback shift register having k stages and p intermediate taps, where k and p are positive integers and k>p, comprising the steps of:
   supplying a received symbol sequence to an input of, and shifting the sequence through, a shift register having k stages with p intermediate taps in positions corresponding to the p taps of the linear feedback shift register;
   recursively adding a respective con-elation signal at the input and at each intermediate tap of the shift register; and
   producing each correlation signal by correlating at least two signals from said input, intermediate taps, and output of the shift register other than the signal to which the respective correlation signal is added.

2. A method as claimed in claim 1 wherein the step of producing each correlation signal comprises producing a product of the signs of said at least two signals and of a minimum absolute value of said at least two signals.

3. A method as claimed in claim 2 wherein the step of supplying the received symbol sequence to the input of the shift register comprises the step of modifying the received symbol sequence in accordance with a non-linear function.

4. A method as claimed in claim 1 wherein the step of supplying the received symbol sequence to the input of the shift register comprises the step of modifying the received symbol sequence in accordance with a non-linear function.

5. A method as claimed in claim 1 wherein p=1.
6. A method as claimed in claim 2 wherein p=1.
7. A method as claimed in claim 3 wherein p=1.
8. A method of synchronizing a received symbol sequence to a PN (pseudo random) sequence which can be generated by a linear feedback shift register having k stages and p intermediate taps, where k and p are positive integers and k>p, comprising the steps of:
   shifting the received symbol sequence through a shift register having k stages with p intermediate taps in positions corresponding to the p taps of the linear feedback shift register;
   at the input and at each intermediate tap of the shift register, recursively adding to the shift register contents a respective correlation signal;
   producing the correlation signal for adding at the input of the shift register by correlating p+1 signals from the p intermediate taps and the output of the shift register; and
   producing the correlation signal for adding at each of the p intermediate taps by correlating the p+1 signals from the input, output, and p−1 other intermediate taps of the shift register.

9. A method as claimed in claim 8 wherein the step of producing each correlation signal comprises producing a product of the signs and of a minimum absolute value of the p+1 signals being correlated.

10. A method as claimed in claim 9 and including the step of supplying the received symbol sequence to the input of the shift register via a non-linear function.

11. A method as claimed in claim 8 and including the step of supplying the received symbol sequence to the input of the shift register via a non-linear function.

12. A method as claimed in claim 8 wherein p=1.
13. A method as claimed in claim 9 wherein p=1.
14. A method as claimed in claim 10 wherein p=1.
15. A synchronization arrangement for synchronizing an input symbol sequence in accordance with a PN (pseudo random) sequence which can be generated by a linear feedback shift register having k stages and p intermediate taps, where k and p are positive integers and k>p, comprising:
   a k-stage shift register having an input, an output, and p intermediate taps in positions corresponding to the p taps of the linear feedback shift register;
   a first correlator for correlating p+1 signals from the p intermediate taps and the output of the shift register to produce a first correlation signal;
   a first adder arranged for recursively adding the first correlation signal to the input symbol sequence and for supplying the sum of the input of the shift register;
   at least p further adder(s) each arranged at a respective one of the p intermediate taps of the shift register for recursively adding a respective one of p further correlation signals to the contents of the shift register at the respective tap; and
   at least p further correlator(s), each arranged for supplying a respective one of the p further correlation signals to the respective further adder, for correlating signals from the input, the output, and p−1 other intermediate taps of the shift register.

16. A synchronization arrangement as claimed in claim 15 wherein each correlator comprises a unit for producing as the respective correlation signal the product of the signs and the minimum absolute value of the signals being correlated.

17. A synchronization arrangement as claimed in claim 15 and including a non-linear function via which the input symbol sequence is supplied to the first adder.

18. A synchronization arrangement as claimed in claim 17 wherein p=1.

19. A synchronization arrangement as claimed in claim 16 wherein p=1.

20. A synchronization arrangement as claimed in claim 15 wherein p=1.

* * * * *